GOODWIN & BROWN.
Harvester Rake.

No. 64,522. Patented May 7, 1867.

GOODWIN & BROWN.
Harvester Rake.
No. 64,522.
2 Sheets—Sheet 2.
Patented May 7, 1867.
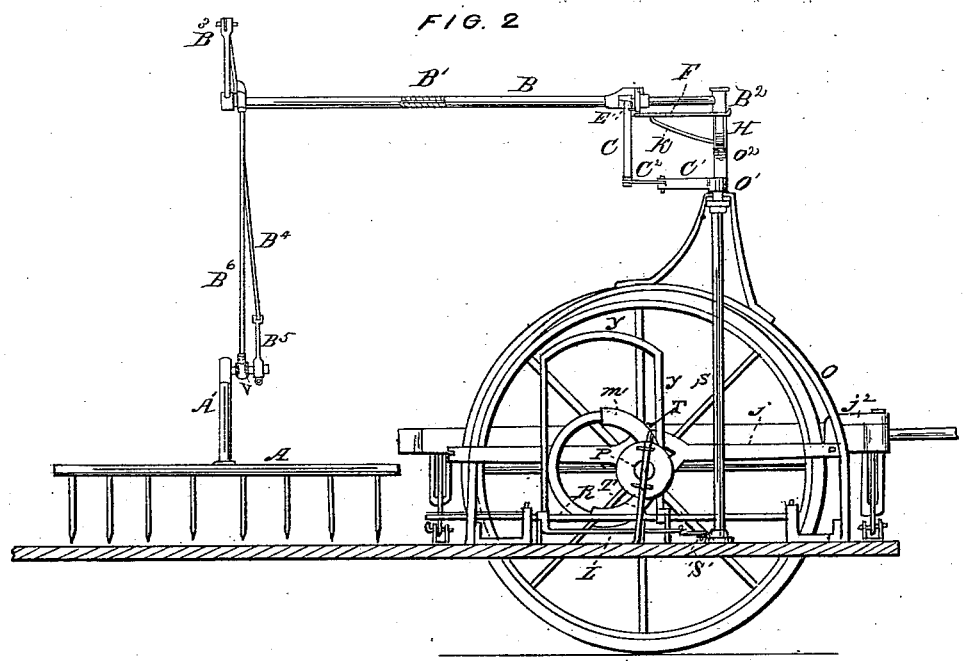
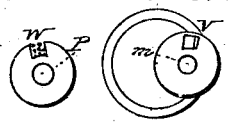
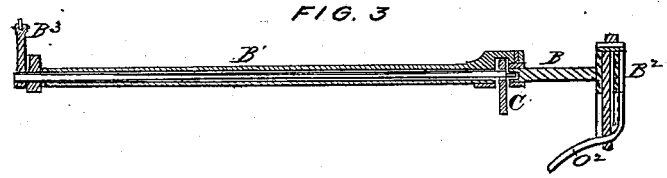
WITNESSES:
John A. Tauberschmidt
Lewis Wieser
INVENTORS:
Wm. L. Goodwin
A. W. Browne

United States Patent Office.

WILLIAM F. GOODWIN, OF WASHINGTON, DISTRICT OF COLUMBIA, AND ARTHUR W. BROWNE, OF BROOKLYN, NEW YORK.

*Letters Patent No. 64,522, dated May 7, 1867.*

IMPROVEMENT IN HARVESTER-RAKES.

*The Schedule referred to in these Letters Patent and making part of the same.*

TO ALL WHOM IT MAY CONCERN:

Be it known that we, WILLIAM F. GOODWIN, of the city and county of Washington, and District of Columbia, and ARTHUR W. BROWNE, of the city of Brooklyn, Kings county, State of New York, have invented certain new and useful Improvements in the Mechanism for Operating Harvester-Rakes; and we do hereby declare the following to be a full, clear, and exact description of the nature, construction, and operation of the same, reference being had to the accompanying drawings, which are made part of this specification, and in which—

Figure 2 is a side elevation of the same, showing the mechanism by which motion is imparted to the rake.

Figure 3 is a detached section through the hollow arm B, showing the crank-shaft $B^1$, with its cranks C and $B^3$.

Figure 4 is a detached view of the plate or disk P, with its notch or recess W.

Figure 5 is a detached view of the cam M, showing the stud or projection U, which is made to fit in the notch W in the plate P.

Figure 1:
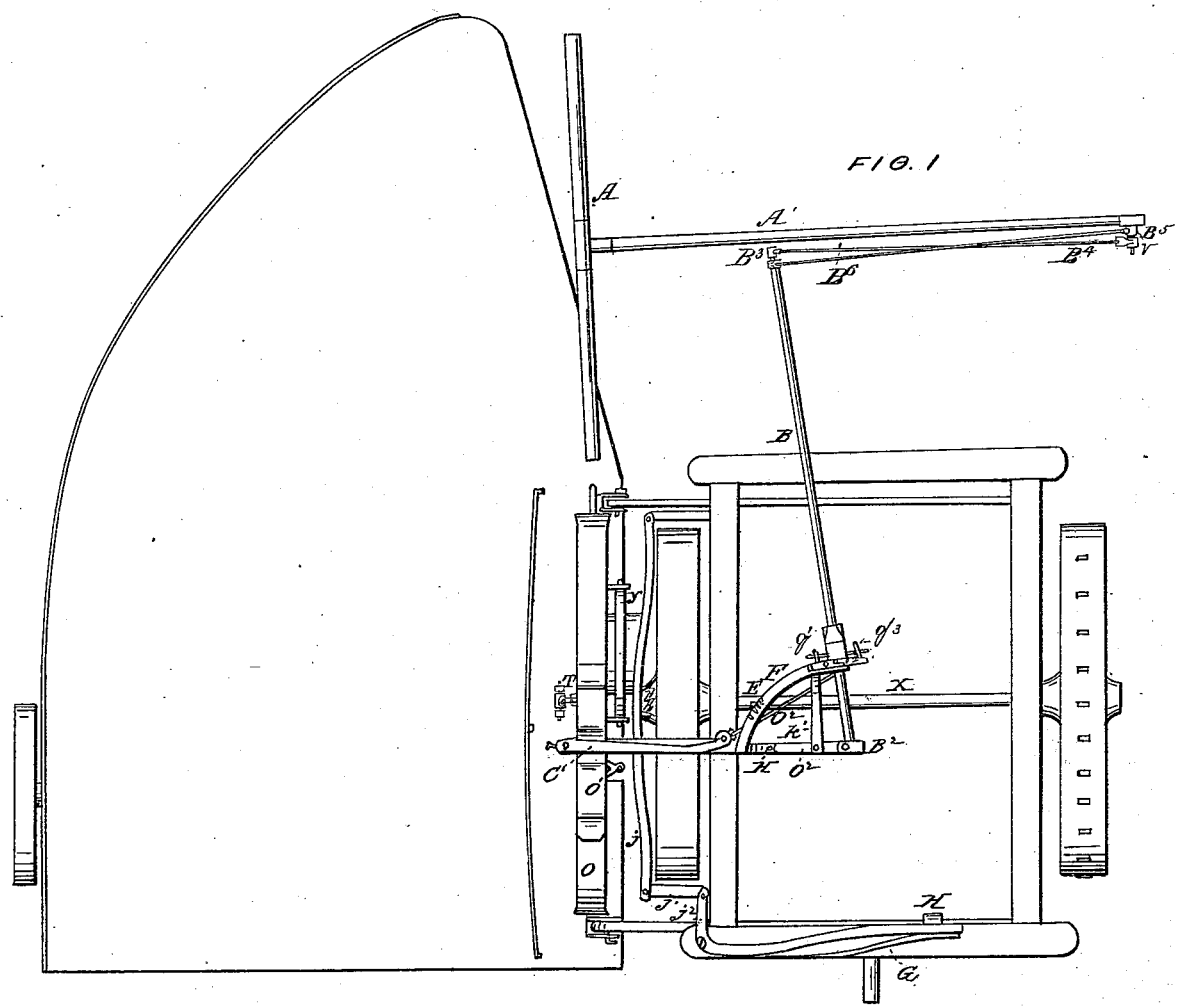
Figure 1 is a top view looking down from above, showing a plan of a harvester embodying our improvements.

The letters O $O^1$ and $O^2$, in figs. 1 and 2, represent the frame or posts, and projecting arm, which form the supports for the hollow arm B, which also supports the crank-shaft $B^1$ and the rake. The letters A and $A^1$ represent the rake and its handle; the letter B the hollow arm; $B^2$ the post on which the arm swings, and which forms the centre of motion for the same.

Similar letters of reference indicate corresponding parts in the several figures.

This improvement relates to mechanism for operating the rake, for the purpose of raking grain from the platform of reaping machines. The apparatus is attached to and travels with the harvester, and is operated by the driving-wheels of the machine, and serves to rake the grain from the platform, and deposits it on the ground in gavels sufficiently large to form a sheaf. The construction is simple, and very efficient in operation, and can be attached to different varieties of reaping machines.

To enable others skilled in the art to which our invention appertains to fully understand and use the same, we will proceed to describe it in connection with the accompanying drawings.

The platform is represented as constructed to permit the grain to be swept off at one side, the gavel being delivered on the ground in rear of the driving-wheels. The apparatus for operating the rake is mounted partly on the side of the platform, near the driving-wheel, and partly on the end of axle X, which is extended sufficiently to receive it. The shape of the platform being curvilinear, the movements of the rake are made to correspond therewith. As this application has exclusive reference to the devices by which the rake is operated we will limit the description to such devices, and refer to parts of the reaping apparatus only by way of elucidation. The two ends of the frame O are fastened to the platform, in front of and behind the wheel, so as to allow the wheel to play under the circle of the frame, when the platform is vibrating in passing over rough ground. $O^1$ is a projection extending up from the circle of the frame sufficiently high to form a receptacle and bearing for the end of the rock-shaft S, and a support for the projecting arm $O^2$. The arm $O^2$ is a projection from the frame O and $O^1$, being fastened to the top of the frame $O^1$ and projecting over the inside wheel, toward the centre of the frame of the machine, between the two wheels, sufficiently to form the centre or fulcrum of motion on which the rake swings. F is a track, a segment of a circle, fastened to the arm $O^2$ by means of short bars K $K^1$ extending up from the end of the arm and fastened to each end of the track. The track F serves to carry the arm B, supporting it, and relieving the post $B^2$, and also serves as stops to hold the arm B while the rake descends to the platform, and while the rake is being elevated. The notches E E at the ends of the track serve as stops or receptacles, into which the pawls $q$ $q^2$ drop, thus stopping the motion of the arm at each end of the track until the pawl is raised by the motion of the crank C, which turns the shaft $B^1$, and by means of the pins $q^1$ $q^3$ raises the pawls out of the notches. $B^2$ is a post having journals at each end, and pivoted on the end of the arm or projection $O^2$, and forms a pivotal support for the arm B. B is a tubular arm through which passes the rock-shaft $B^1$. One end of the arm B is fastened to the post $B^2$, and swings with the same. At the other end of the arm B is fastened a projecting arm, $B^6$, which supports the rake.

Having described the means by which the moving apparatus is attached to the machine and supported, we will now describe the means by which motion is imparted to the rake. The cam M is placed on the end of the axle X, and fitted loosely, so as to allow the axle to turn in the cam, and to allow the cam to move on the axle when thrown in and out of gear with the clutch. The cam is thrown in and out of gear by means of the bar J and spring G. This apparatus is so arranged that a sheaf may be gathered at each revolution of the driving-wheel, if desired, or the sheaf may be varied as the driver may wish. When it is desired to rake a sheaf at each revolution of the driving-wheel, the driver places his foot against the lever $J^2$ and pushes it over the catch H, and allows it to remain there as long as that motion is required. When the motion is to be changed it is done by throwing the lever off the catch, which allows the spring G to act, and throws the cam out of gear with the clutch, and throws it in gear with the plate P, which stops the cam from turning with the axle X, thus stopping the motion of the rake at a desired point, while sufficient grain is falling on the platform to form a sheaf. The cam is provided with a projection or stud, U, on one side, which slips into a recess, W, in the plate P, which serves to stop the rake, and retain it in an elevated position, so as not to prevent the grain from falling on the platform. The disk or plate P is held in position and prevented from turning with the axle by the rod T, which is fastened by its lower end to the platform, and passes through slotted projections on the side of the plate P, which allows the rod to work up and down and to vibrate and conform to the motion of the platform. The yoke Y is fitted over the cam M, and hinged to projections on the rod R. The link L is hinged to a projection from the rod R at one end, and attached to the crank S' at the other end. When the machine is in motion the cam turns within the yoke, moving it forward and backward, moving the rod R and link L with it, and, by means of the link L acting on the crank S', imparting motion to the rock-shaft S. The crank-arm $C^1$ is fastened to the top of the rock-shaft S. By this means motion is imparted to the crank-arm $C^1$, and by the link $C^2$ to the crank-arm C, which also imparts motion to the rock-shaft $B^1$. The arm B is moved forward and backward by the crank-arm $C^1$, which operates the link $C^2$ and the crank-arm C. The crank-arm C is fastened on the rock-shaft $B^1$. When the cam-yoke is moved forward by the cam, the crank-arm $C^1$ is moved forward also, turning the rock-shaft $B^1$, which elevates the rake and holds it up in an elevated position. When the arm B has moved forward, carrying the rake to the front of the platform, the pawl $q^2$ drops into the notch E, locking the arm in its forward position, until the motion is reversed and the rake has descended to the platform. When the movement is reversed the swinging end of the crank-arm C moves first, turning the rock-shaft $B^1$, causing the rake to descend to the platform; the arm B being held forward in position by the pawl $q^2$ until the pin $q^3$ on the shaft $B^1$ or crank-arm C raises the pawl out of the notch, and unlocks the arm B. The shaft $B^1$ having turned as far as it is allowed, stops turning and carries the arm B with it, moving the rake over the platform in its effective stroke. The turning of the rock-shaft $B^1$ causes the elevation and depression of the rake. When the arm B is being moved forward by the crank-arm $C^1$ pulling on the crank-arm C, the shaft B is turned, moving the crank-arm $B^3$ backward, which also moves the rod $B^4$ which turns the crank-arm $B^5$ backward and elevates the rake. The rake is elevated and depressed by the turning of the rock-shaft $B^1$ before the arm B starts to move. When the cam moves backward it reverses the movement of the arm $C^1$, which reverses the shaft $B^1$, causing the rake to descend to the platform before the arm B is unlocked. When the rake has nearly reached the platform the pin $q^3$ raises the pawl $q^2$, unlocking the arm B, which is pushed backward by the arm $C^1$ acting through the link $C^2$ on the crank-arm C. The force being applied to the swinging end of the arm C, holds the shaft $B^1$ from turning, and thereby holds the rake down to the platform. The crank-arm $B^5$ is fastened to a stud or short shaft, V, which passes through a hole or sleeve in the end of the projecting arm $B^6$, and is fastened to the end of the rake-handle. When the crank-arm $B^5$ is operated it turns the stud V in the end of the arm $B^6$, and elevates and depresses the rake.

Having thus described our invention, what we claim as new, and desire to secure by Letters Patent, is—

1. The plate P with its recess W, the projecting stud U on the cam M, and the rod T, combined and arranged to operate in the manner and for the purpose substantially as described.

2. Crank S', rock-shaft S, crank-arm $C^1$, link $C^2$, crank-arm C, rock-shaft $B^1$, crank-arm $B^3$, rod $B^4$, and crank-arm $B^5$, combined and arranged to operate in the manner and for the purpose substantially as described.

3. The projecting arm $O^2$, track F with its notches E E, pawls $q$ and $q^2$, pins $q^1$ and $q^3$, and hollow arm B, combined and arranged to operate in the manner and for the purpose described.

WM. F. GOODWIN,
A. W. BROWNE.

Witnesses:
 A. FOSTER,
 EDM. F. BROWN.